Oct. 30, 1951 R. I. WEBER 2,573,122

DUAL SPEAKER CONTROL

Filed May 11, 1949

RENNIE I. WEBER
*INVENTOR.*

BY [signature]

HIS AGENT

Patented Oct. 30, 1951

2,573,122

UNITED STATES PATENT OFFICE 2,573,122

DUAL SPEAKER CONTROL

Rennie Irwin Weber, Chicago, Ill., assignor to Zenith Radio Corporation, a corporation of Illinois Application May 11, 1949, Serial No. 92,721

5 Claims. (Cl. 179—1)

This invention relates to a novel volume control and, more particularly to a volume control for selectively apportioning the potential of a two-terminal signal source between a pair of transducers.

For a particular installation of a radio receiver in an automobile it is advantageous to provide one loudspeaker supported on the dashboard to serve persons riding in the front seat, and another supported on a shelf located in the vicinity of the rear seat to serve persons riding in the rear. Since the front and rear portions of an automobile may be subjected to different intensities of externally produced noises, such as those produced by wind, the motor, the road and so on, it is desirable to apportion the intensity of audio signals emanating from each of the two loudspeakers. In addition, the power supply for an automobile radio receiver necessarily limits the available power from the output audio amplifier stage. Thus, an electrical circuit for accomplishing the required result by apportioning the electrical signals of the audio output stage between the pair of loudspeakers must operate with a minimum of power loss.

It is, therefore, an object of this invention to provide a novel volume control for selectively apportioning the potential of a signal source between a pair of transducers.

It is a further object of the invention to provide a system, including a volume control and a circuit, for selectively apportioning the potential of an audio signal source between a pair of loudspeakers and in which a minimum of audio power loss is incurred.

In accordance with the invention, a volume control for selectively apportioning the potentials of a signal source between a pair of transducers comprises an elongated resistance element including first, second and third sections of susbtantially equal length connected in series in the recited order. The second section has an electrical resistance of predetermined value and the first and third sections individually have an electrical resistance less than that of the second section. The volume control also includes a pair of electrically conductive contactors spaced apart by a distance approximately equal to the length of one of the sections so as to engage different sections of the resistance element and the contactors are supported for simultaneous movement along the resistance element. In addition, means are provided for moving the contactors along the resistance element.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figures 1, 2:
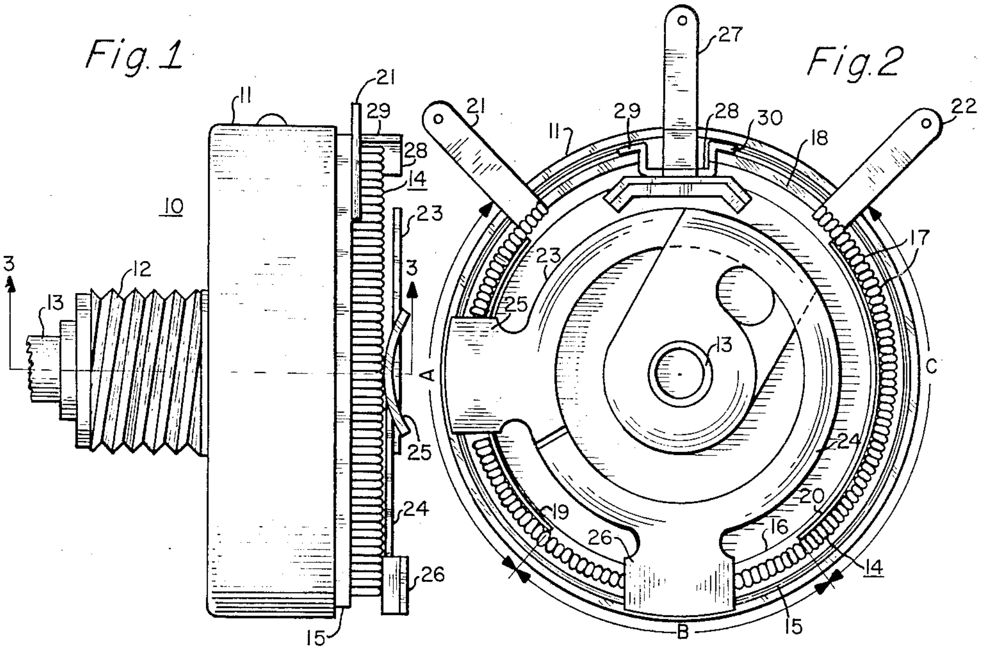
Fig. 1 is a side view of a volume control embodying the present invention.
Fig. 2 is a rear view of the volume control shown in Fig. 1.

Referring to Fig. 1 of the drawing, the volume control 10 there represented includes a cylindrically shaped, electrically conductive casing 11 and a hollow, threaded, electrically conductive bushing 12 affixed thereto. An electrically conductive control shaft 13 is supported for rotation within bushing 12.

Referring now to Fig. 2, there is shown a cylindrically shaped resistance element 14 supported within casing 11, but electrically insulated therefrom by means of a cylindrical washer 15 and a circular washer 16.

Resistance element 14 is composed of a resistance wire 17 wound upon a cylindrically shaped member 18 formed of an insulating material, as is well known in the art of producing wire wound volume controls and potentiometers. An electrical conductor 19 is soldered across a portion of the turns of resistance element 14, thereby short circuiting such turns to form a section "A" having a low value of electrical resistance approaching zero. This is shown more clearly in Fig. 3. Section "A" originates at one end of resistance element 14 and extends through an arc thereof of approximately 95°. This section is then followed by a section "B" having a predetermined electrical resistance value greater than zero, connected in electrical and physical series relation with section "A." The resistance of section "B" depends on the resistance-length characteristic of resistance wire 17. Section "B" extends through an arc of approximately 90° and is, in turn, electrically and physically connected with a section "C" similar in electrical and physical characteristic to section "A." Section "C" terminates at the remaining end of resistance element 14 and a conductor 20 short circuits the turns thereof.

Affixed to respective ends of resistance element 14 are terminals 21 and 22, to facilitate making electrical connections therewith. It is apparent that resistance element 14 may, if desired, be constructed of a carbon element having end portions coated with or constructed of a material having a low resistivity. Also, instead of utilizing conductors 19 and 20, the turns of portions "A" and "C" of resistance element 14 could be short-circuited by a coating of silver paint or other form of electrically conductive material having very low specific resistance.

Affixed to the rear end of shaft 13 are a pair of electrically conductive, resilient, spring members 23 and 24 which support contactors 25 and 26, respectively. The spring members 23 and 24 serve electrically to connect contactors 25 and 26 with shaft 13 as well as mechanically to bias each of the contactors into engagement with resistance element 14. The contactors are thus supported for simultaneous movement along the resistance element 14. Contactors 25 and 26 are spaced to subtend an arc approximately of 95° along resistance element 14, to engage different portions thereof. As pointed out hereinbefore, shaft 13 is physically connected with contactors 25 and 26, and thus, means are provided for moving the contactors along the resistance element.

Since contactors 25 and 26 are electrically connected with shaft 13 through spring members 23, 24 and since shaft 13 is supported by bushing 12, which is electrically connected with casing 11, the contactors are also electrically connected with the casing. A terminal 27 is physically and electrically connected with casing 11 and provides a common connection for the contactors. Although casing 11, bushing 12 and shaft 13 have been described as being formed of electrically conductive material, it is within the contemplation of this invention to form any of these elements of insulating material. In such an application, terminal 27 may be connected with the contactors by means of a commutator-brush arrangement.

A member 28 is supported on casing 11 in the vicinity of terminal 27 and includes stop members 29 and 30 positioned at the opposed ends of resistance element 14. Stop members 29 and 30 restrict movement of contactors 25 and 26 at opposite ends of resistance element 14.

Although volume control 10 and resistance element 14 have been shown as having a circular contour along which the contactors travel, the resistance element may be linear in form and the contactors, in such an instance, are moved linearly along such an element.

Figures 3, 4:
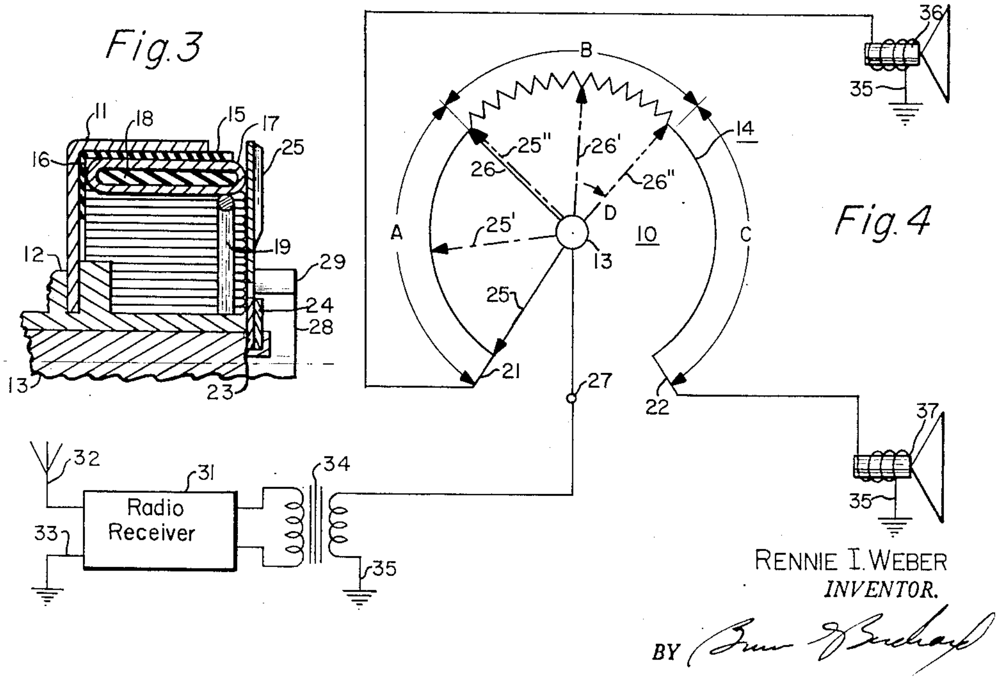
Fig. 3 is a sectional view taken along the line 3—3 of Fig. 1.
Fig. 4 shows a circuit diagram, partially schematic, including a volume control embodying the present invention.

Referring now more particularly to Fig. 4 and the circuit embodying the present invention, there is a two-terminal source of audio signals represented by a radio receiver 31 including an antenna 32 and a ground 33. The audio output circuit of radio receiver 31 comprises the primary winding of an output transformer 34, the secondary winding of which is connected between a ground return 35 and terminal 27 of volume control 10. Terminal 21 of the volume control is connected to ground return 35 through the voice coil winding of a permanent magnet loudspeaker or other transducer 36 and terminal 22 thereof is connected to ground return 35 through the voice coil winding of another permanent magnet loudspeaker or other transducer 37.

Purely by way of example, and not by way of limitation, in a particular application of the present invention volume control 10 includes a resistance element 14 in which section "B" has a resistance of 20 ohms, and the resistance of sections "A" and "C" in series, as measured through contactors 25 and 26 is 0.75 ohm or less. In addition, the input impedance of each of the voice coil of loudspeakers 36 and 37 is 3 ohms and transformer 34 provides a source impedance of 3 ohms.

Assuming that contactors 25 and 26 are in the positions indicated in full lines in Fig. 4, the output of radio receiver 31 is connected directly across the voice coil of loudspeaker 36. Also, the output of radio receiver 31 is connected across the voice coil of loudspeaker 37 but through the resistance of section "B" of resistance element 14. Thus, the major portion of the output of receiver 31 is applied across the voice coil of loudspeaker 36 whereas a small fraction of the output is applied across the voice coil of loudspeaker 37 by virtue of the voltage dividing action produced by resistance element 14. As a result, the audio signals from loudspeaker 36 are of greater intensity than those from loudspeaker 37.

Assume now that shaft 13 is rotated, carrying the contactors in the direction of arrow "D" to the dash-dot positions designated 25' and 26'. It is apparent that the voice coil of loudspeaker 37 is connected across the output of radio receiver 31 through only a portion of section "B" of resistance element 14 and the voice coil of loudspeaker element 37 is connected directly across the output of the receiver. Thus, the proportionate share of signal potentials impressed on loudpeaker 26 and the intensity of audio signals reproduced thereby are greater than in the first-mentioned case. Of course, since the radio receiver 31 generally is not a source of constant voltage, the signal voltages impressed on the voice coil of loudpeaker 37 are somewhat smaller than in the first-mentioned case.

Further assuming that the control shaft 13 is rotated to carry the contactors to the dash-dot-dot positions indicated 25'' and 26'', it is clearly evident that the voice coils of both loudspeakers 36 and 37 are connected directly in parallel across the output of radio receiver 31 and share equally the signal output thereof. In this case, both loudspeakers will normally produce audio signals of equal intensity.

It is apparent that successive rotation of control shaft 13 in the direction of arrow "D" causes the output of radio receiver 31 to be apportioned with increasingly greater signal potentials being impressed on the voice coil of loudspeaker 37 than on the voice coil of loudspeaker 36. Thus, by manipulating control shaft 13, signal voltages can be selectively apportioned between loudspeakers 36 and 37 in any required ratio.

It should be noted that in any position of contactors 25 and 26 either the voice coil of loudspeaker 36 or that of loudspeaker 37 is connected directly across the output of radio receiver 31. Therefore, the major share of the audio power output of receiver 31 is impressed either on both of the loudspeakers, or on one, with only a small power loss resulting in section "B" of resistance element 14.

Thus, it may be seen that the arrangement of Fig. 4 is a very simple volume control circuit for apportioning the potentials of an audio signal source between a pair of loudspeakers. Further, the arrangement is operable with a minimum of power loss.

Although the above-described embodiment discloses the invention as applied to an automobile radio receiver having a pair of loudspeakers, it is to be understood that the invention may also be employed in connection with any source of signal voltage or audio amplifier and any pair of load impedances or pair of transducers. When utilized in connection with a public address system, for example, the identical circuit and the advantages described above are applicable.

While a particular embodiment of the present invention has been shown and described, it will be obvious to those skilled in the art that changes and modifications may be made therein without departing from this invention in its broader aspects, and therefore, the aim in the appended claims is to cover all such changes and modifications as fall within the true spirit and scope of this invention.

I claim:

1. A volume control circuit for selectively apportioning the potential of a signal source between a pair of transducers, comprising: a volume control including an elongated resistance element having first, second and third sections of substantially equal length connected in series in the recited order, said second section having an electrical resistance of predetermined value, and said first and third sections individually having an electrical resistance less than that of said second section; a pair of electrically conductive contactors included in said volume control, spaced apart by a distance approximately equal to the length of one of said sections so as to engage different sections of said resistance element, and supported for simultaneous movement along said resistance element; means for moving said contactors along said resistance element; and means for connecting each of said transducers to said source through respective ones of said contactors and through said resistance element.

2. A volume control circuit for selectively apportioning the potential of a two-terminal signal source between a pair of transducers, comprising: a volume control including an elongated resistance element having first, second and third sections of substantially equal length connected in series in the recited order, said second section having an electrical resistance of predetermined value, and said first and third sections individually having an electrical resistance small relative to that of said second section; a pair of electrically conductive contactors included in said volume control, spaced apart by a distance approximately equal to the length of one of said sections so as to engage different sections of said resistance element, and supported for simultaneous movement along said resistance element; means for moving said contactors along said resistance element; and means for connecting each of said transducers to said source including an individual connection between respective ends of said resistance element and each of said transducers, a connection between each of said transducers and one terminal of said source, and a connection between each of said contactors and the other terminal of said source.

3. A volume control for selectively apportioning the potentials of a signal source between a pair of transducers, comprising: an elongated resistance element including first, second and third sections of substantially equal length connected in series in the recited order, said second section having an electrical resistance of predetermined value, and said first and third sections individually having an electrical resistance less than that of said second section; a pair of electrically conductive contactors spaced apart by a distance approximately equal to the length of one of said sections so as to engage different sections of said resistance element, and supported for simultaneous movement along said resistance element; and means for moving said contactors along said resistance element.

4. A volume control for selectively apportioning the potentials of a signal source between a pair of transducers, comprising: an elongated resistance element including first, second and third sections of substantially equal length connected in series in the recited order, said second section having an electrical resistance of predetermined value, and said first and third sections individually having a resistance small compared with that of said second section; a pair of electrically conductive contactors spaced apart by a distance approximately equal to the length of one of said sections so as to engage different sections of said resistance element, and supported for simultaneous movement along said resistance element; and means for moving said contactors along said resistance element.

5. A volume control for selectively apportioning the potentials of a signal source between a pair of transducers, comprising: a resistance element including first, second and third sections electrically and physically connected in series in the recited order, said second section having an electrical resistance of predetermined value and a predetermined length, and said first and third sections individually having a resistance small relative to that of said second section and having a length approximately equal to that of said second section; a pair of electrically conductive contactors, spaced apart a distance approximately equal to the length of one of said sections so as to engage different sections of said resistance element, and supported for simultaneous movement along said resistance element; a pair of spring elements coupled to each of said contactors to bias said contactors into engagement with said resistance element; means for moving said contactors along said resistance element; and a pair of stop members supported at respective ends of said resistance element for restricting movement of said contactors.

RENNIE IRWIN WEBER.

REFERENCES CITED

The following references are of record in the file of this patent:

UNITED STATES PATENTS

| Number | Name | Date |
|---|---|---|
| 1,695,875 | Aiken | Dec. 18, 1928 |
| 1,883,624 | Doran | Oct. 18, 1932 |
| 1,887,065 | Painter | Nov. 8, 1932 |
| 1,892,935 | De Forest | Jan. 3, 1933 |
| 2,023,603 | Lodge | Dec. 10, 1935 |
| 2,030,573 | Dull | Feb. 11, 1936 |
| 2,037,842 | Wolff | Apr. 21, 1936 |
| 2,262,757 | Coe | Nov. 18, 1941 |
| 2,404,387 | Lovell et al. | July 23, 1946 |